(12) United States Patent
Marggraff et al.

(10) Patent No.: US 8,682,747 B1
(45) Date of Patent: Mar. 25, 2014

(54) METHOD AND SYSTEMS FOR PROVIDING PERSONALIZED TRAINING

(75) Inventors: Brett Marggraff, Westerly, RI (US); Elaine Marggraff, Westerly, RI (US)

(73) Assignee: Your Advice Device, LLC, Westerly, RI (US)

(*) Notice: Subject to any disclaimer, the term of this patent is extended or adjusted under 35 U.S.C. 154(b) by 0 days.

(21) Appl. No.: 13/428,149

(22) Filed: Mar. 23, 2012

Related U.S. Application Data

(63) Continuation-in-part of application No. 11/191,456, filed on Jul. 28, 2005, now Pat. No. 8,150,739, and a continuation of application No. 12/037,368, filed on Feb. 26, 2008, now Pat. No. 8,239,285, and a continuation of application No. 12/037,353, filed on Feb. 26, 2008.

(51) Int. Cl.
*G06Q 30/00* (2012.01)

(52) U.S. Cl.
USPC .................. 705/26.61; 705/26.62; 705/26.64; 705/26.7

(58) Field of Classification Search
USPC ............................................... 705/26.1–27.2
See application file for complete search history.

(56) References Cited

U.S. PATENT DOCUMENTS

| | | |
|---|---|---|
| 5,918,211 A | 6/1999 | Sloane |
| 6,014,451 A | 1/2000 | Berry et al. |
| 6,397,219 B2 | 5/2002 | Mills |
| 6,434,530 B1 | 8/2002 | Sloane et al. |
| 6,641,037 B2 | 11/2003 | Williams |
| 6,807,574 B1 | 10/2004 | Partovi et al. |
| 6,837,436 B2 | 1/2005 | Swartz et al. |
| 6,842,767 B1 | 1/2005 | Partovi et al. |
| 6,979,199 B2 * | 12/2005 | Barron .......................... 434/219 |
| 7,206,772 B2 | 4/2007 | Tolley |
| 7,209,895 B2 | 4/2007 | Kundtz et al. |
| 7,224,781 B2 | 5/2007 | Jacob et al. |
| 7,421,285 B1 | 9/2008 | Rao et al. |
| 2001/0021935 A1 | 9/2001 | Mills |
| 2002/0059186 A1 | 5/2002 | Weber et al. |
| 2003/0074559 A1 * | 4/2003 | Riggs ............................ 713/168 |
| 2003/0083925 A1 | 5/2003 | Weaver et al. |
| 2003/0100337 A1 | 5/2003 | Chotkowski et al. |
| 2004/0221239 A1 * | 11/2004 | Hachigian et al. ............ 715/762 |
| 2005/0246223 A1 | 11/2005 | Roth et al. |
| 2005/0247213 A1 | 11/2005 | Slilaty |
| 2006/0265233 A1 | 11/2006 | Mundy |
| 2006/0272208 A1 | 12/2006 | Altman et al. |
| 2011/0093393 A1 * | 4/2011 | Chang et al. .................... 705/50 |

OTHER PUBLICATIONS

"OFM: Drink: On auto palate: Tim Atkin's essential guide to wine: Trying to describe what a wine tastes like is just asking for an entry in Pseuds' Corner: Smells like coffee, looks like motor oil . . . it must be Shiraz." Tim Atkin. The Observer. London (UK): Mar. 14, 2004. p. 60.*

(Continued)

*Primary Examiner* — Michael Misiaszek

(74) *Attorney, Agent, or Firm* — Burns & Levinson LLP; Orlando Lopez

(57) ABSTRACT

Methods and systems for providing personalized training.

13 Claims, 8 Drawing Sheets

(56) References Cited

OTHER PUBLICATIONS

"OFM: Drink: On auto palate: Tim Atkin's essential guide to wine: Trying to describe what wine tastes like just asking for an entry in Pseuds' Corner: Smells like coffee, looks like motor oil... it must be Shiraz." Tim Atkin. The Observer. London (UK): Mar. 14, 2004, p. 60. Retrieved via Proquest on Jan. 30, 2012.

Reply to Non-final Office Action dated Feb. 8, 2011 for co-pending U.S. Appl. No. 12/037,368, filed Feb. 26, 2008. Applicants: Brett Marggraff, et al.

Non-final Office Action dated Dec. 27, 2010 for co-pending U.S. Appl. No. 12/037,353, filed Feb. 26, 2008. Applicants: Brett Marggraff, et al.

Welcome to ChoiceMaster® Downloaded from www.choicemaster.com on Jan. 10, 2008. Copyright © 1998-2007, ChoiceMaster, LLC.

Iverson, T. "What's in Store: Wine retailers vary vastly in selection and service. Here's a guide to some of the best ones." © The Boston Phoenix, Dec. 14-21, 2000. Retrieved from http://www.bostonphoenix.com/archive/features/00/12/14/WINE.html on Jul. 28, 2005.

* cited by examiner

US 8,682,747 B1

METHOD AND SYSTEMS FOR PROVIDING PERSONALIZED TRAINING

CROSS REFERENCE TO RELATED APPLICATIONS

This application is a continuation in part of U.S. patent application Ser. No. 11/191,456, titled METHOD AND SYSTEMS FOR PROVIDING SPECIALTY PRODUCT INFORMATION TO CONSUMERS, filed Jul. 28, 2005, which is herein incorporated by reference in its entirety. This application is also is also a continuation of U.S. patent application Ser. No. 12/037,353 filed Feb. 26, 2008 titled METHOD AND SYSTEMS FOR PROVIDING SPECIALTY PRODUCT INFORMATION and a continuation of U.S. patent application Ser. No. 12/037,368 filed Feb. 26, 2008 titled METHOD AND SYSTEMS FOR PROVIDING SPECIALTY PRODUCT INFORMATION.

BACKGROUND

These teachings relate generally to method and systems for providing personalized training.

A consumer venturing to purchase a specialty product, such as, but not limited to, wine, can face a difficult experience. As described by a Boston Phoenix journalist, "[u]nless you are already a wine expert, navigating a wine shop can be a difficult experience. So many names, so many bottles, so many sources. Although critics, advertisements, and other external sources of information can be helpful, it's hard to persuade the most wine critics to go shopping with you." (Thor Iverson, *What's In Store*, The Boston Phoenix, Dec. 14-21, 2000)

The same problem exists when purchasing specialty beers, liqueurs, cigars, specialty cheeses and other products such as horticultural products and supplies.

Training constitutes a time-consuming and expensive aspect of the hospitality (and most other) industry. It is difficult (and can be expensive) to pinpoint key training areas for individual employers. Training is usually provided to groups of employees were different employees from the group have different levels of proficiency. Such group training can be ineffective since those are at a higher level of proficiency would be required to be trained in areas where they do not need training.

BRIEF SUMMARY

An embodiment of the method of these teachings for providing specialty product information to consumers includes the steps of obtaining, in electronic form, identifying information for a specialty product of interest to a consumer, providing the identifying information to a computer system, retrieving, from a database accessible from the computer system, specialty product information related to the specialty product of interest to the consumer, and providing, to the consumer, the specialty product information.

An embodiment of the system of these teachings includes an electronic components capable of obtaining identifying information for a predetermined specialty product, at least one processor, the electronic component being also capable of providing the obtained identifying information to the at least one processor, a database comprising a data structure having specialty product information correlated with the identifying information, an output device accessible to a consumer, at least one computer usable medium having computer readable code embodied therein, the computer readable code being capable of causing the at least one processor to retrieve the obtained product information from the electronic component, query the database for specialty product information related to the specialty product identified by the identifying information, obtain, from the database, the specialty product information, and provide, to the output device accessible by the consumer, the specialty product information.

In one or more embodiments, the method of these teachings for providing personalized training includes assembling, from training information retrieved from a database, the database being accessible from a computer system, a personalized training module, the database comprising the training information, the training information having been obtained from a variety of sources, and downloading the assembled personalized training module to an audio player.

In one or more embodiments of systems that implement the method of these teachings are also disclosed.

For a better understanding of the present teachings, together with other and further needs thereof, reference is made to the accompanying drawings and detailed description and its scope will be pointed out in the appended claims.

DETAILED DESCRIPTION

Before describing the present teachings in detail, certain terms are defined herein for the sake of clarity.

"Specialty product," as used herein, refers to a food product or any other product having such a variety, history, and a wide range of attributes such that it requires significant expertise in order to understand the range of details of the product. Examples of specialty products are, but not limited to, wines (vintage or varietal wines), specialty beers such as microbrewery or certain imported beers, cordials, cigars, cheeses and horticultural products and supplies such as plants, fertilizers, plant food, or other treatment materials.

"Specialty product information," as used herein, refers to detailed information requiring expertise in the product, such as, but not limited to, tasting notes by expert sources (such as expert opinion and treatises), in the instance where the product is a horticultural product, planting and or growing/fertilizing/pest control notes from expert sources, similar products in a category, similar products a category but at a lower price point, information on the product such as that supplied by a critic or an expert, and the like. "Specialty product information," as used herein, should be differentiated from standard product reviews produced by nonexperts but can include compiled opinions of nonexperts (such as "specialty product ranking information" as described hereinbelow).

"Specialty product ranking information," as used herein, refers to information such as that described hereinabove, obtained from a compilation of consumer or user reviews instead or in addition to expert sources, such as expert opinion and treatises. The "specialty product ranking information" can include a compiled ranking and representative user comments.

Figure 1A:
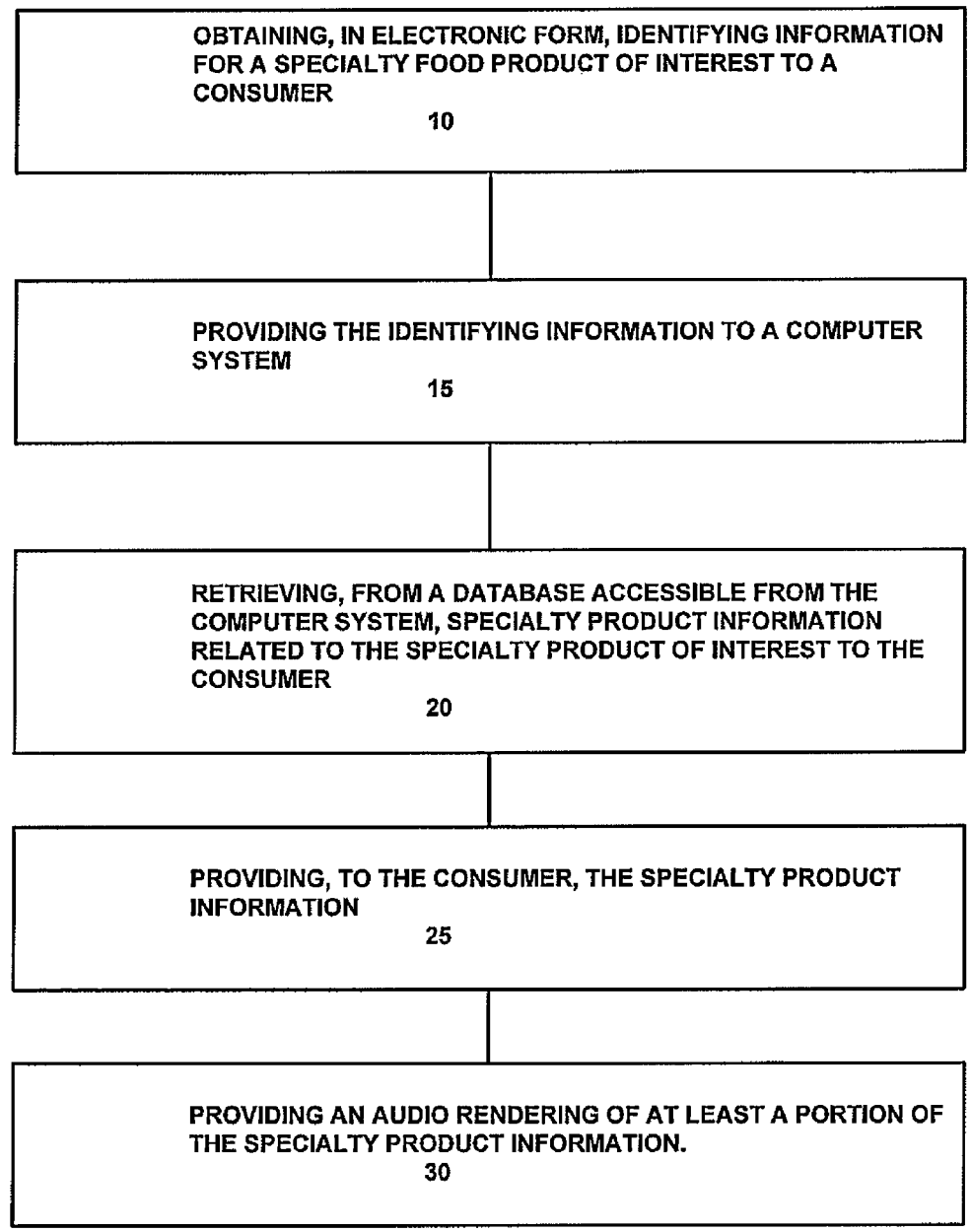
FIG. 1a is a flowchart of an embodiment of the method of these teachings.

A flowchart of an embodiment of the method of these teachings is shown in FIG. 1a. Referring to FIG. 1a, an embodiment of the method of these teachings for providing specialty product information to consumers includes the steps of obtaining, in electronic form, identifying information for a specialty product of interest to a consumer (step 10, FIG. 1a), providing the identifying information to a computer system (step 15, FIG. 1a), retrieving, from a database accessible from the computer system, specialty product information related to the specialty product of interest to the consumer (step 20, FIG. 1a), providing, to the consumer, the specialty product information (step 25, FIG. 1a), and, in one instance, providing an audio rendering of at least a portion of the specialty product information (step 30, FIG. 1a).

Figure 2:
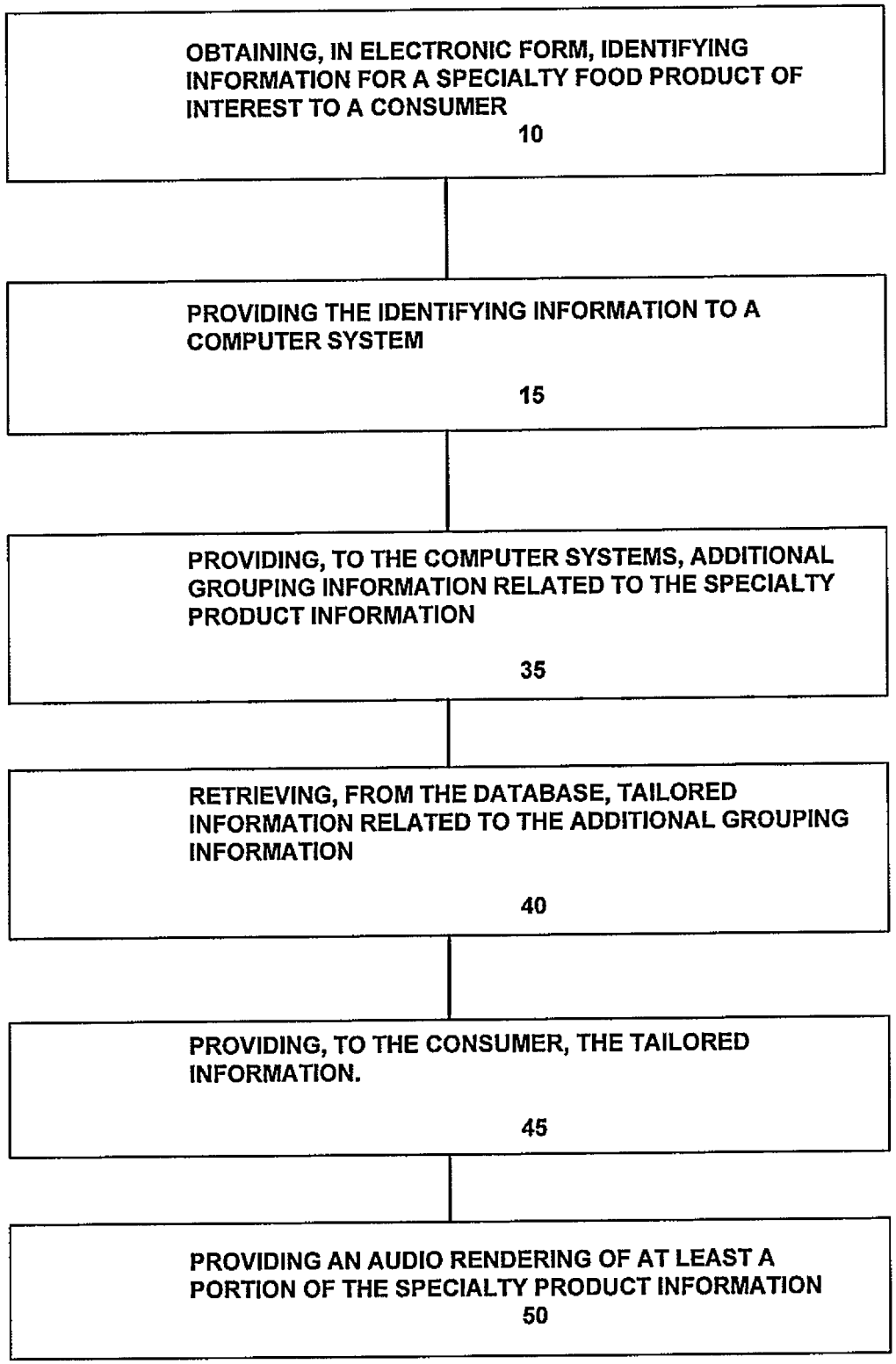
FIG. 2 is a flowchart of yet another embodiment of the method of these teachings.

A flowchart representation of another embodiment of the method of these teachings is shown in FIG. 2. Duplicate steps (steps that are at the same as those in FIG. 1a) have the same number. Referring to FIG. 2, that embodiment of the method of these teachings includes the steps of obtaining, in electronic form, identifying information for a specialty product of interest to a consumer (step 10, FIG. 2), providing the identifying information to a computer system (step 15, FIG. 2), providing, to the computer system, additional grouping information related to the specialty product information (step 35, FIG. 2), retrieving, from the database, tailored information related to the additional grouping information (step 40, FIG. 2), providing, to the consumer, the tailored information (step 45, FIG. 2), and, in one instance, providing and audio rendering of at least a portion of the tailored specialty product information (step 50, FIG. 2).

In another instance, information can be transferred between the point-of-sale (POS) system and the computer system. The transfer of information provides the ability to update the database for availability and price of the specialty product.

In order to be able to accommodate specialty product items that do not have identifying information, in one embodiment, the method of these teachings also includes the ability to enter or supply identifying information when it can not be obtained directly from the specialty product item. The entering of identifying information can occur while constructing the database and can be provided to the consumer in any form of a visual display (ranging from the note cards to the ability to enter the name of the specialty product).

Figure 1B:
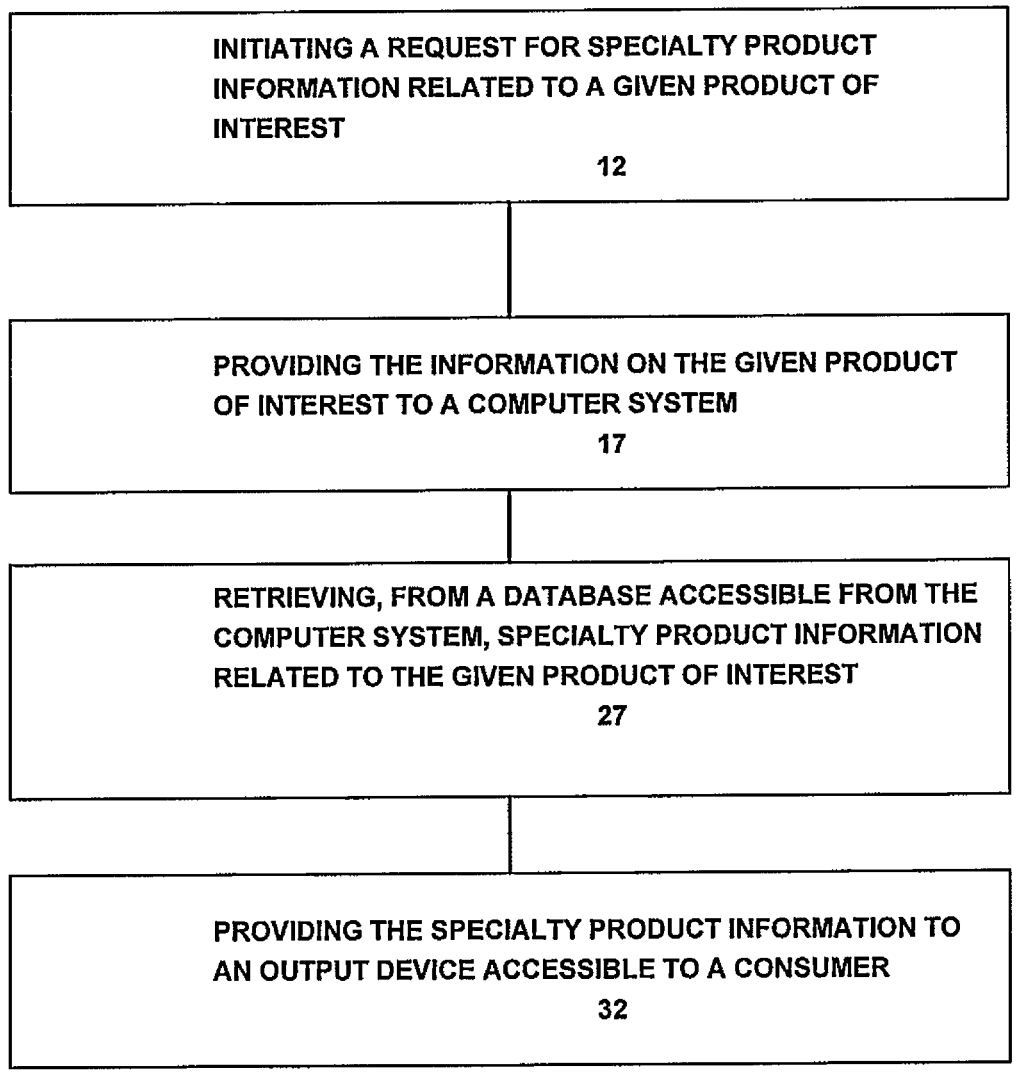
FIG. 1b is a flowchart of another embodiment of the method of these teachings.

A further embodiment of the method of these teachings is shown in FIG. 1b. Referring to FIG. 1b, an embodiment of the method of these teachings for providing specialty product information related to another product of interest includes the steps of initiating a request for specialty product information related to a given product of interest (for example, but not limited to, a particular food item such as meat, or poultry, or a particular variety of cheese, or in another instance, a particular plant or plant variety) (step 12, FIG. 1b), providing the information on the given product of interest to a computer system (step 17, FIG. 1b), retrieving, from a database accessible from the computer system, specialty product information related to the given product of interest (step 27, FIG. 1b), and providing the specialty product information to an output device accessible to a consumer (step 32, FIG. 1b). The output device can be a visual output device (such as, a display) or an audio output device (such as, a speaker or a group of speakers).

In one embodiment, the database of these teachings includes a data structure, where the data structure (which in one embodiment can be, but is not limited to, an array) includes an identifier data element identifying a specialty product, one or more specialty product information data elements, where the specialty product information is obtained from specialized sources, such as, but not limited to, expert opinions and/or treatises, wherein the specialty product information data elements can be queried to obtain one or more relationships between the specialty product and another product. In another embodiment, the data structure also includes one or more relationships between the specialty product and another product. (There are several possible implementations of a data structure including relationships between data. In one instance, but not limited only to this instance, XML data elements can be used. See for example, US Patent Application Publication number 2002/0087571, which is incorporated by reference herein.) In one instance, the other product is another specialty product. In another instance, the other product is another consumer product.

In another embodiment, the specialty information is obtained by obtaining information on a specialty product from each one of a number of consumers. The information on the specialty product includes at least one attribute. Each one of the consumers provides information on the attributes. This embodiment has several advantages, one of which being that consumers will use language for describing the attributes that is understandable to other consumers. (For example, this embodiment not been limited to only that example, in the instance where the specialty product is wine, consumers will use language to describe the smell, or "nose," of the wine that is more commonly used then attributes such as "wet stone" or "barnyard.") A measure (also referred to as "specialty product ranking information"), indicative of consumer opinion, is obtained for each attribute from the information obtained from all of the consumers. (The measure could be an average, a median score, or any other similar measure.) The specialty product information includes each attribute and the measure obtained for that attribute.

In the above described embodiment for obtaining the specialty product information, the consumer can enter the information regarding the attributes via the Internet (at a provided website, for example; entering the information can occur at the retail establishment providing the product or remotely by accessing the website) or via an input device at the retail establishment (input devices can include, but not limited to, keyboards or voice input utilizing voice recognition), the obtaining of the "specialty product ranking information" is, in one instance, performed by computer readable code executing in one or more processors. The attributes and the corresponding the "specialty product ranking information, which in one instance can include comments, form part of the specialty product information.

In an illustrative embodiment of the database of these teachings, the specialty product is wine and the relationship can be, in one instance, same varietal wines or wines from the same region or similar wines in the same price range. In another instance, the other consumer product is a food item such as, for example, but not limited to, prime rib, and the relationship can be wines that "go well" with that food item.

In another illustrative embodiment of the database of these teachings, the specialty product is a horticultural products, such as, but not limited to, a plant (and annual or perennial flower, herb, vegetable plant, tree, fruit or nut tree, water lilies, pine trees, vines, and grasses), groundcovers (such as mulch, pine needles, etc.), fertilizers, seeds, bulbs, chemical and nonchemical soil and/or ground or plant treatment.

In the embodiment in which the specialty product is a horticultural product, practice of the embodiment of the method shown in FIG. 1a, includes the steps of obtaining, in electronic form, identifying information for the horticultural product of interest to a consumer, providing the identifying information to a computer system, retrieving, from a database accessible to the computer system, horticultural product information related to the horticultural product of interest to the consumer and providing to the consumer the obtained horticultural product information. For example, the consumer would input or scan the barcode for a particular plant and obtain from the database information such as, but not limited to, the zones for best use (even to the detail of which areas in a particular ZIP code would be best for such a plant), whether annual or perennial, the size at full growth, what are the plant requires moderate sun or shade, flower color, bloom time, foliage color through calendar year, plant spacing, fertilizer suggested, etc. The information can be provided to the consumer, in one instance via an audio rendering or, in another instance, via displays. In one embodiment, the consumer can download information to a portable storage device. In another embodiment, the consumer receives printed information.

In one instance, the consumer can also receive grouping information such as, but not limited to, other plants to use in forming a hedge, developing a garden with a color scheme (in one instance, the consumer can input information such as, but not limited to, the color scheme), fertilizers to use with a particular plant, etc.

Figure 3A:
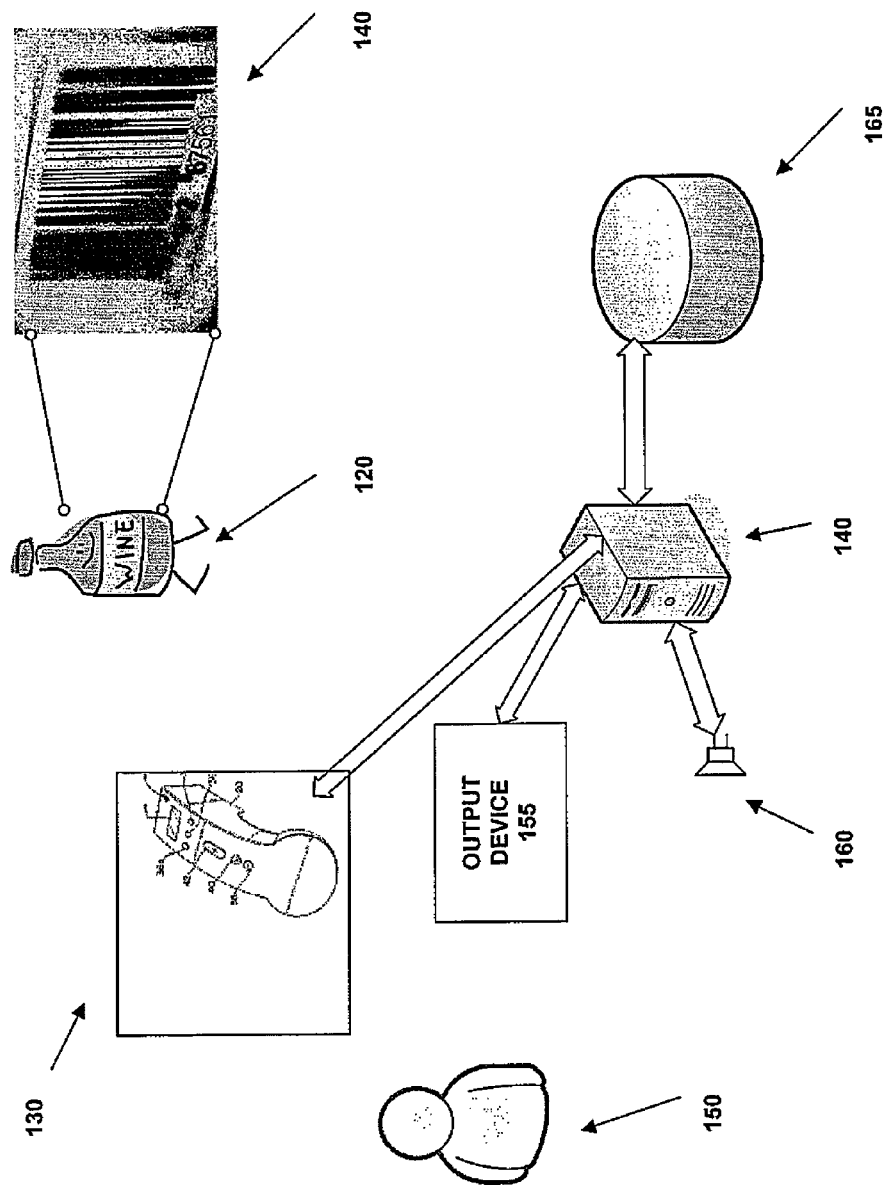
FIG. 3a is a pictorial schematic representation of a consumer practicing an embodiment of the method of these teachings.

In order to better illustrate the methods of these teachings, an illustrative embodiment is described below. It should be noted that these teachings is not limited to this illustrative embodiment. A pictorial representation of a consumer practicing the illustrative embodiment of the method of these teachings is shown in FIG. 3a. Referring to FIG. 3a, the specialty product in this embodiment is wine 120 and the means for obtaining in electronic form the identifying information is a wireless handheld scanner 130 (in some embodiments, a wired handheld scanner could also be used). The identifying information, in this embodiment, is a barcode 140. The consumer 150 selects a bottle of wine 120, scans the barcode 140 on the bottle of wine 120 with the wireless handheld scanner 130. The wireless handheld scanner 130 provides the barcode information to a computer system 145. The computer system accesses a database 165 and retrieves from the database 165 specialty product information related to the bottle of wine 120. The specialty product information is provided to the consumer via one or more of many possible output devices 155. The output device 155 can be, in one embodiment, a wireless display device (or a wired display device). Another display device can be, in one embodiment, a wireless speaker 160. The wireless or wired speaker can provide an audio rendering of at least a portion of the specialty product information.

In another instance, the wireless display device 155 can also have touch input capability and serve to provide to the computer system additional grouping information related to the specialty product information. In yet another instance, the handheld scanner has an audio output capability and can serve as an input/output device. In still another instance, the output device has audiovisual capabilities, for example, but not limited to, providing short video clips with sound. It should be noted that other combinations of input and output devices are within this scope of these teachings.

In one embodiment, the specialty product information for wine includes a wine rating from an expert source (such as Robert Parker or the Wine Spectator), tasting reviews from an expert source (such as those previously mentioned or a magazine such as Gourmet, on Appetit, or Food and Wine), a description of the wine varietal, vintage, others similar wines in stock, and the like. (For a vintage wine, the tasting review includes both vintage specific, nonvintage and generic responses period) The specialty product information can, in one embodiment, includes information from specialized books and treatises. The additional grouping information can include a request for a request for food/wine match information or wine matching a particular food category.

Figure 5:
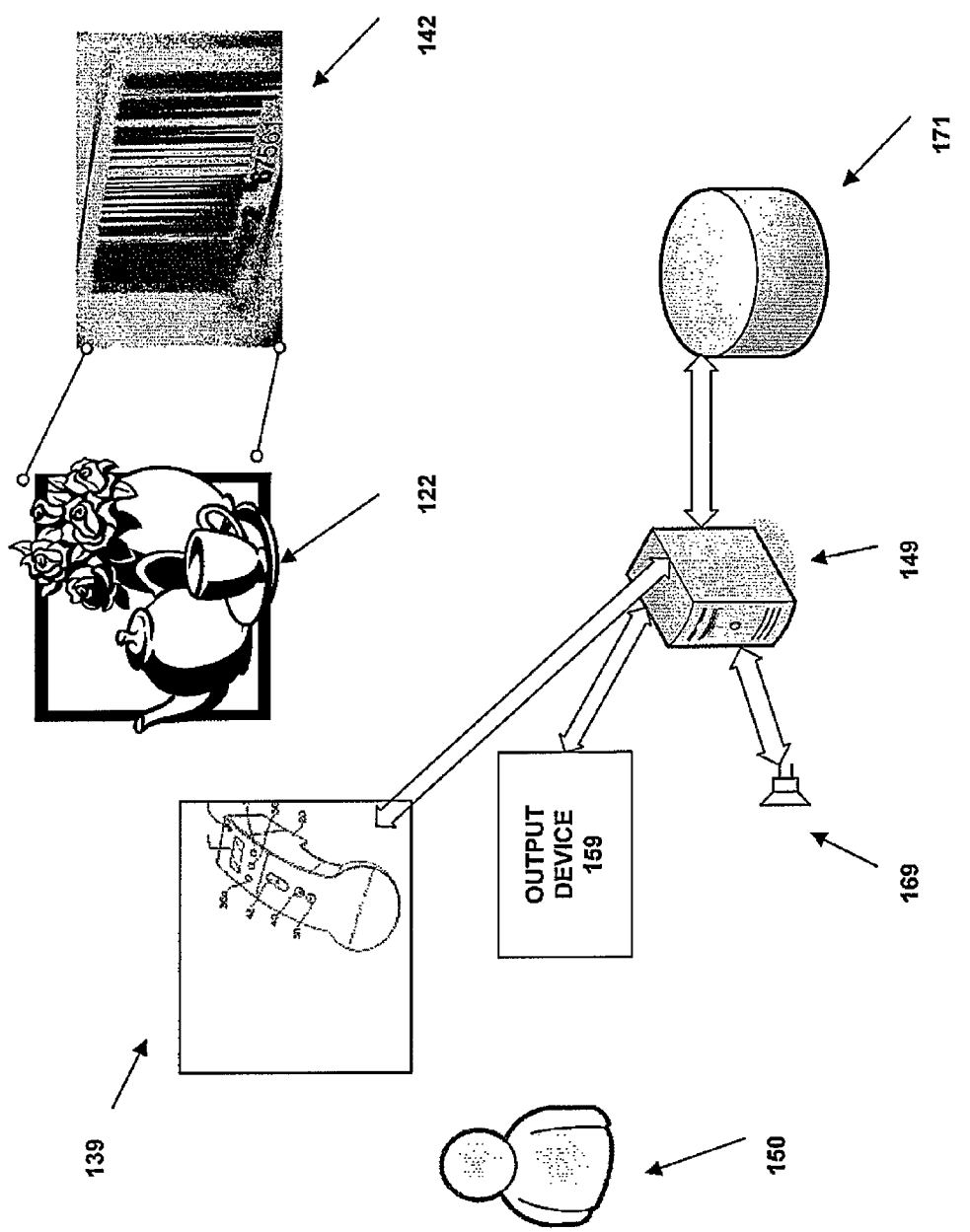
FIG. 5 is a pictorial schematic representation of a consumer practicing another embodiment of the method of these teachings.

Another illustrative embodiment is shown in FIG. 5. A pictorial representation of a consumer practicing the other illustrative embodiment of the method of these teachings is shown in FIG. 5. Referring to FIG. 5, the specialty product in this embodiment is a horticultural product 122 and the means for obtaining in electronic form the identifying information is an input device 139 (in some embodiments, a wireless handheld scanner, a wired handheld scanner could also be used; in other embodiments, a touch sensitive screen or a keyboard and 2). The identifying information, in this embodiment, is a barcode 142. The consumer 150 selects a a horticultural product 122, scans the barcode 142 on the horticultural product 122 with the input device, such as a wireless handheld scanner, 139. The input device 139 provides the barcode information to a computer system 149. The computer system accesses a database 171 and retrieves from the database 171 specialty product information related to the horticultural product 122. The specialty product information is provided to the consumer via one or more of many possible output devices 159. The output device 159 can be, in one embodiment, a wireless display device (or a wired display device). Another display device can be, in one embodiment, a wireless speaker 169. The wireless or wired speaker can provide an audio rendering of at least a portion of the specialty product information.

In another instance, the output device (a wireless display device in one instance) 159 can also have touch input capability and serve to provide to the computer system additional grouping information related to the specialty product information. In yet another instance, the handheld scanner has an audio output capability and can serve as an input/output device. In still another instance, the output device has audiovisual capabilities, for example, but not limited to, providing short video clips with sound. It should be noted that other combinations of input and output devices are within this scope of these teachings.

In one embodiment, the specialty product information for a horticultural product includes the climates zone(s) for planting, the best time to plant, whether annual or perennial, duration of bloom, colors available, changing color with season, related or suggested fertilizers, etc. The specialty product information can, in one embodiment, includes information from specialized books and treatises (such as, but not limited to, the Sunset Western Garden book and information from the Agricultural Extension Service affiliated with land grant universities). The additional grouping information can include a horticultural products can be used with another horticultural product, such as, but not limited to, plants that can be used to achieve a desired effect, fertilizers suggested, suggested Garden design.

In one instance, the specialty product information can be relayed to the consumer's computer (computer as used herein includes devices such as, but not limited to, personal computers, laptops, PDAs, iPods and similar devices) via the Internet. In another instance, the specialty product information can be relayed to the consumer's computer via a wireless or wired connection or via a portable storage device, such as, but not limited to, a memory stick, a writable optical disc, or a magnetic memory.

The database is updated at regular intervals and at a predetermined time frame selected not to interfere with the use of the database for consumer access. The updates to the database can be performed remotely (via the Internet for example) or by means of any computer usable medium (such as, but not limited to, optical disk or tape).

Figure 3B:
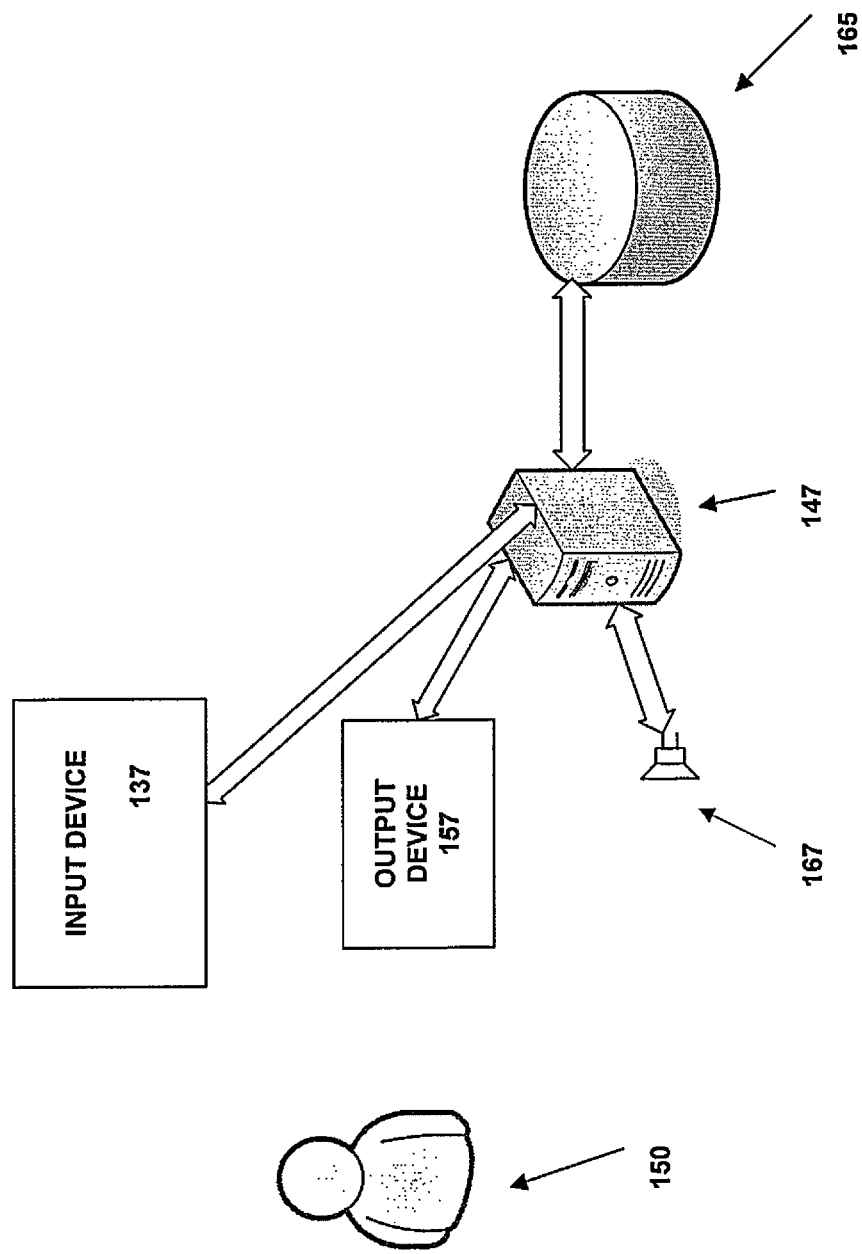
FIG. 3b is a pictorial schematic representation of a consumer practicing an embodiment of the method of these teachings.

Another illustrative embodiment is shown in FIG. 3b. Referring to FIG. 3b, the consumer 150 initiates a request for specialty product information related to a particular product of interest. The request initiation can occur, in one embodiment, by means of an input device 137 (such as, but not limited to, a touch screen) or, in another embodiment, it can occur by means of a sensing device that senses the proximity of the consumer and initiates the request. It should be noted that these teachings is not limited to only these two embodiments. The request is provided to a computer system 147. The computer system accesses a database 167 and retrieves specialty information related to the particular consumer product. In one instance, but not limited only to this instance, the computer system retrieves information on wines that would complement a particular food item (such as, meat, poultry, cheese, etc.). The specialty product information is then provided to an output device 157 (such as, but not limited to, a display and/or a speaker or group of speakers 167). The output device 157, 167 can be wired or wireless connected to the computer system 147. In one embodiment, the computer system also provides other information of interest along with the specialty product information. (For instance, the computer systems could provide information related to the price of the particular consumer product of interest or advertisements related to the particular consumer product of interest.)

In an exemplary embodiment, provided herein to better illustrate the method and system of these teachings, the database includes information related to wine. In this exemplary embodiment the database includes identifying information such as read from a barcode, the producer name (such as, for example, Robert Mondavi or Duckhorn), the type of product or varietal (such as, for example, Chadornnay, reserve), the vintage (such as, for example, 1994), the region of origin (such as, for example, Napa Valley, Calif. or Maipo Valley, Chile), awards accolades or ratings (such as, for example, Wine Spectator "highly recommended" with a rating of "95"), a full or partial review a report on the wine of interest (such as, for example, the best Mondavi reserve Chadornnay ever, this is trim and compact at first with tartly accented ripe pear), the source of information (such as, for example, Wine Spectator Apr. 30, 1997), suggested food or cheese matches (such as, for example perfect with lobster or brie cheese), pointers or correlation to food items (allowing the selection of a food item of interest and providing for the relating back to wine suggestions), pointers to related wines (allowing for the indication of for example, but not limited to, similar wines, wines in a similar price range, wines from similar is the same region). The database can also include brief descriptions of the varietal or the wine of the of the region, audio or music selections that are correlated to a particular wine or group of wines.

The system related to the above described exemplary embodiment includes the capability of updating or augmenting the database to include pricing or promotional information, to select the audio or music correlated to a particular wine or category of wines.

In the above exemplary embodiment, the additional grouping information related to the wines can include, but is not limited to, similar wines, wines in a similar price range, wine from a similar or the same region, suggested food items to be paired with the wine and request for brief description of the varietal or wines of the region.

In the above exemplary embodiment, a request can be sent, either directly by the consumer or initiated otherwise, for wines that can be consumed with a particular food item of interest. One such matching, for example, but not a limitation of these teachings, would be, if a request is initiated for wines that match prime rib, wines in the range of $10-$15, the request would yield, for example, Clos du Bois, Merlot McManis, and Merlot Columbia Crest. In one instance, in this exemplary embodiment, the consumer can indicate the price range.

Figure 4:
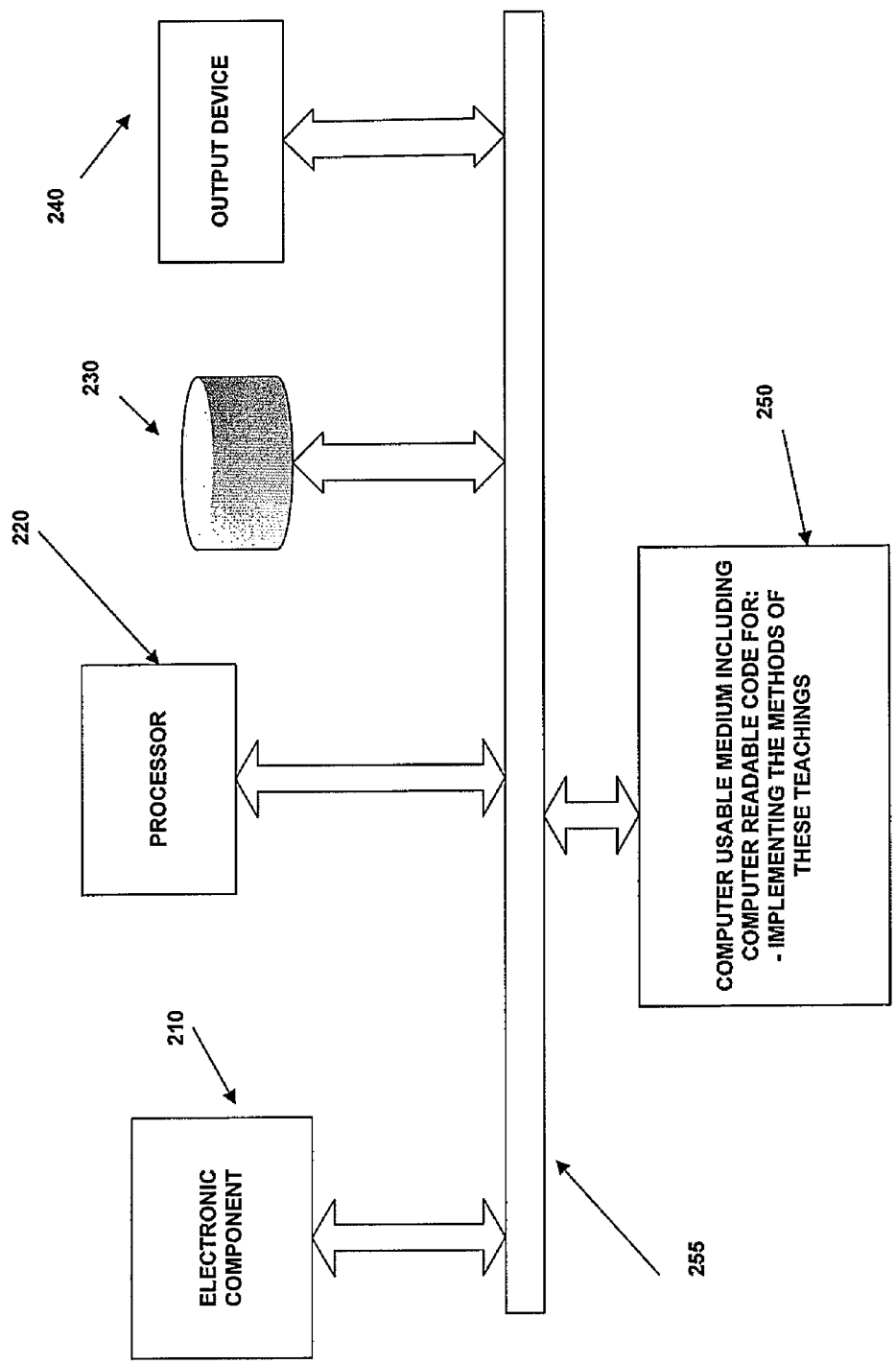
FIG. 4 is a schematic graphical representation of a block diagram of an embodiment of the system of these teachings.

An embodiment of the system of these teachings is shown in FIG. 4. Referring to FIG. 4, that embodiment of the system of these teachings includes an electronic component 210 capable of obtaining identifying information for a predetermined specialty product, at least one processor 220, the electronic component 210 being also capable of providing the obtained identifying information to the at least one processor 220, a database 230 comprising a data structure having specialty product information correlated with the identifying information, an output device 240 accessible to a consumer, at least one computer usable medium 250 having computer readable code embodied therein, the computer readable code being capable of causing the at least one processor to execute the methods of these teachings.

The electronic component 210 can, in one embodiment, be a wired or wireless handheld scanner. The wired or wireless handheld scanner can communicate to a computer system including the one or more processors 220. In another embodiment, the electronic component 210 can be a wired or wireless an input device (such as, but not limited to, a touch screen) or, in another embodiment, it can be a sensing device that senses the proximity of the consumer and initiates the input. It should be noted that these teachings is not limited to these embodiments of the electronic component 210.

The computer system can be a dedicated computer system located in close proximity to the electronic component (handheld scanner) 210 or can be a distributed or remote computer system (such as a central server). The computer usable medium 250 can be any of a number of possible computer readable memories, such as, but not limited to, solid-state memories, rotating memories, either magnetic or optical tape. If the computer system is a remote system, power or signal boosters may be required.

The output device 240 may be, but is not the limited to, a display (connected either wireless or wired), an audio output device or a combination of both a display and audio output device (such as speakers; in one instance, the speakers may receive synthesized voice obtained from a voice synthesis program). In another instance, the output device 240 may be combined with touch input capabilities in order to act as an output/input device. In yet another instance, the system can also include an input device providing the capability to input additional information, such as, but not limited to, desired consumer information, food to be matched with the specialty product such as wine, and the like.

The database 230 can be a central database in the embodiment wherein the computer system is a remote system such as a central server. In the embodiment in which there is one computer system attached to every electronic component (or to a group of electronic components), a copy of the database 230 can be located at each computer system. It should be noted that other embodiments combining or bridging the two embodiments discussed above are also within the scope of these teachings. For example, the embodiment in which the computer systems, each including one or more processors, are local but several computer systems share one database is within the scope of these teachings.

In another embodiment of the method of these teachings, a method for providing personalized training includes obtaining, for a variety of sources, training information including specialty product information, constructing a database including the obtained training information, assembling, from training information retrieved from the database, a personalized training module, and downloading the assemble personalized training module to an audio player. The audio player having the downloaded personalized training module is provided to a trainee. The specialty product information is obtained from various sources as described hereinabove. The training information can include other information obtained from training manuals, training notes and the like.

The above described embodiment can also include determining whether the downloaded assembled personalized training module was played in the audio player and identifying the audio player on which a downloaded assemble personalized training module was played.

In one exemplary embodiment, the trainees are employed in the hospitality industry (such as, for example, restaurants) and the specialty product information includes information about wines and their relationship to the food being served. It should be noted that this embodiment is only limited to that exemplary embodiment. The training information can be expanded to include other items such as, but not limited to, from the basics of table setting to other liqueurs or details of the menu items. By providing the training modules in audio players, the trainees can receive individualized training and can train at any convenient time (such as, for example, their idle time).

In the above exemplary embodiment, information on the basics of table settings can be obtained, for example, but not limited to, the writings or website of Emily Post and information on the details of the menu items, including, but not limited to, a description of the dish, basic ingredients and highlights of preparation can be obtained, for example, but not limited to, a source such as the Larousse Gastronomique.

Figure 6:
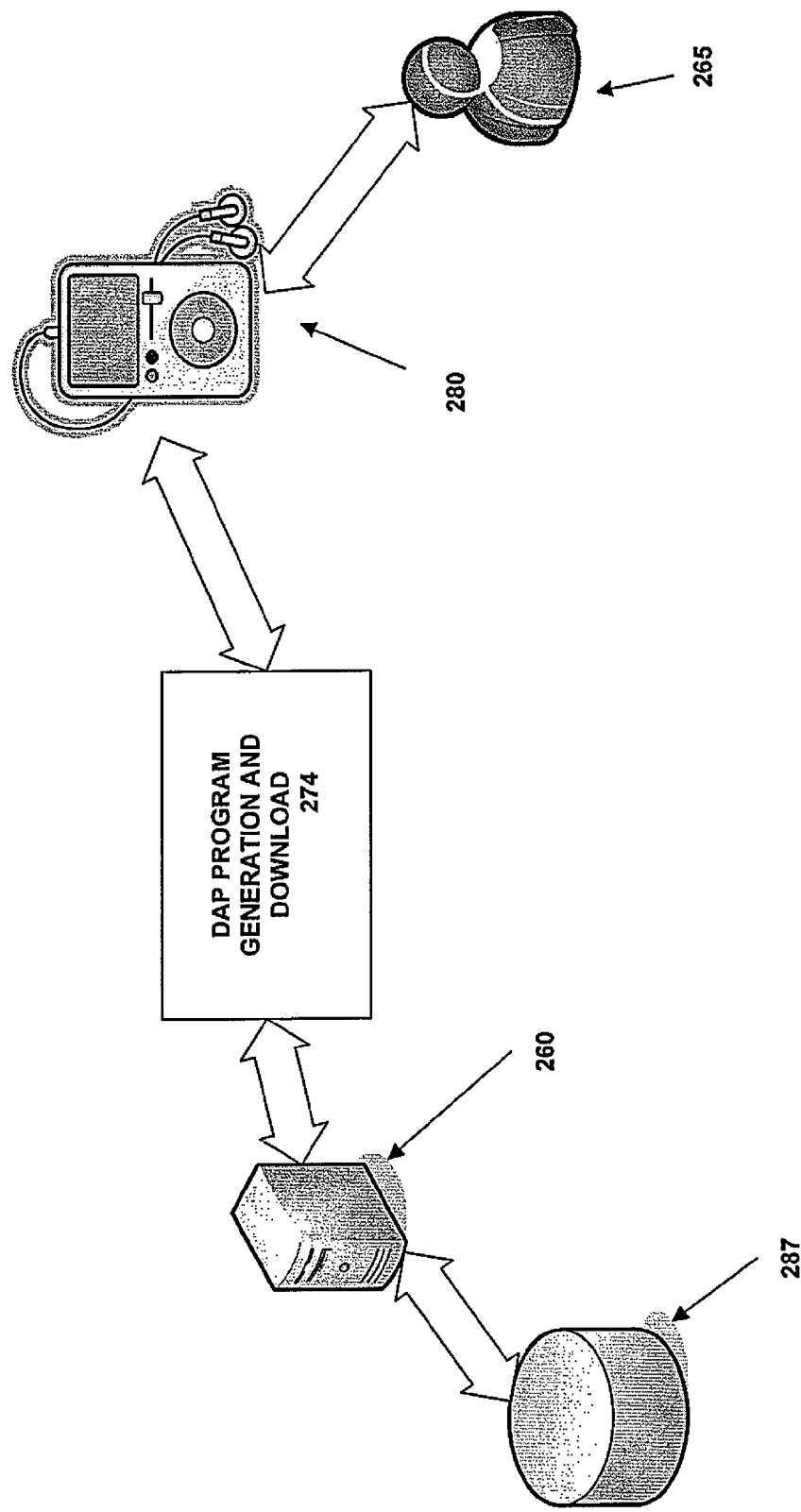
FIG. 6 pictorial schematic representation of yet another embodiment of the method of these teachings.

One embodiment of the system of these teachings for providing personalized training is shown in FIG. 6. Referring to FIG. 6, the embodiment shown there in includes a computer system 260 having one or more processors and one or more computer usable media such as shown in FIG. 4, a database 287 (being a memory for storing data having a data structure stored therein where the data structure comprises training information including specialty product information), an audio media generating and downloading component 274 generating audio information data and downloading the audio information data to audio media that can be played in an audio player 280. (Audio player refers to any device used to play audio.) The specialty product information in the database 287 can be obtained as described hereinabove. The computer usable medium in the computer system 260 has computer readable code embodied therein for causing the one or more processors in the computer system 260 to retrieve training information from the database, assemble personalized training data from the retrieve information and provide the training information to the audio media generating and downloading component 270. It should be noted that the audio media generating and downloading component can be, in one instance, included in the computer system 260. For example, the computer usable media in the computer system 260 can also include computer readable code to convert the training information into audio information. An audio media writer (such as a drive or a player/writer) can receive the audio information and write it on to audio media. Typical audio media are memory capable of storing MP3 data or a variety of recordable media. Typical player writers include MP3 player writers, iPods and a variety of players. The audio media is then placed in or downloaded to an audio player 280 which is provided to a trainee 285.

In one embodiment, the system shown in FIG. 6 is able to determine whether the downloaded assembled personalized training module which is included in the audio media has been played in the audio media player 280 and can also identify the audio media player 280 in which the audio media including the personalized training module has been played. In one instance, the first of above described functions is accomplished by having an end of file indicator in the audio media and either, writing to a storage media in the audio media when the end of file indicator is reached and subsequently reading that storage media or writing to storage media in the audio player when the end of file indicator is reached.

In another instance, the second of the above described functions is accomplished by having an identifier stored or available in the media player 280 and recording that identifier on storage media in the audio media (it should be noted that the storage media could be the same as the audio media). The storage media can then be read to determine on which audio player was the downloaded assembled personalized training module played. Different variations of the above described embodiments also possible. For example, the time duration of the time over the media was played can be recorded and compared to the time duration of the training module. In another instance, the audio media with a downloaded personalized training module has an identifier recorded on the media and the identifier is stored in storage media in the player after the completion of playing. Other variations are also possible.

It should be noted that distributed computer system embodiments are also within the scope of these teachings. Embodiments in which the database is located at a different location from the output device that provides the specialty product information to the consumer are within the scope of these teachings. The communication between the remote database and/or server and the output device can be by wired means, by carrier wave or any other communications means.

It should be noted that, although the embodiments described herein above relate to wine or food products, the scope of these teachings covers other products having such a variety, history, and a wide range of attributes such that it requires significant expertise in order to understand the range of details of the product.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the teachings may be performed by a computer processor executing a program tangibly embodied on a computer-readable medium to perform functions of the teachings by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter Eligibility, 1300 Off. Gaz. Pat. Office 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

Although the teachings have been described with respect to various embodiments, it should be realized these teachings are also capable of a wide variety of further and other embodiments within the spirit and scope of the appended claims.

What is claimed is:

1. A method for providing personalized training, the method comprising the steps of:
    assembling, from training information retrieved from a database, the database being accessible from a computer system, a personalized training module; the database comprising the training information; the training information having been obtained from a variety of sources, the training information comprising specialty product information corresponding to a specialty product; the specialty product information being obtained from at least one expert source;
    wherein said specialty product information comprises information regarding alcoholic beverages; said specialty product information comprising tasting notes by expert sources including expert opinion and treatises, similar products in a category, similar products in a category but at a lower price point, information on the product such as that supplied by a critic or an expert; and
    downloading the assembled personalized training module to an audio player.

2. The method of claim 1 wherein the audio player is provided to a trainee.

3. The method of claim 1 further comprising the steps of:
    determining whether the downloaded assembled personalized training module has been played in the audio player; and
    identifying the audio player on which the downloaded assembled personalized training module was played.

4. The method of claim 1 wherein the specialty product information is obtained from at least one specialized treatise.

5. A system for providing personalized training, the system comprising:
    at least one processor;
    a memory for storing data, said memory comprising:
        a data structure stored in said memory; said data structure comprising training information including specialty product information, said training information resident in a database; the specialty product information corresponding to a specialty product; the specialty product information being obtained from at least one expert source; wherein said specialty product information comprises tasting notes by expert sources including expert opinion and treatises, similar products in a category, similar products in a category but at a lower price point, information on the product such as that supplied by a critic or an expert; and wherein said specialty product information comprises information regarding alcoholic beverages;
    an audio media generating and downloading component capable of generating audio information data and downloading said audio information data to audio media; said downloaded audio information data in said audio media being compatible with an audio player; and
    a computer usable medium having computer readable code embodied therein, said computer readable code being capable of causing said at least one processor to:
        assemble, from training information retrieved from the database, personalized training data; and
        provide said personalized training information to said audio media generating and downloading component.

6. The system of claim 5 wherein the specialty product information is obtained from at least one specialized treatise.

7. The system of claim 5 wherein said downloaded audio information data in said audio media being compatible with a digital audio player.

8. The system of claim 5 further comprising:
    means for determining whether the downloaded assembled personalized training module has been played in the audio player; and
    means for identifying the audio player on which the downloaded assembled personalized training module was played.

9. The system of claim 5 wherein said specialty product information comprises information regarding wines.

10. A computer program product comprising:
    a non-transitory computer usable medium having computer readable code embodied therein, said computer readable code being capable of causing at least one processor to:
        assemble, from training information retrieved from a database, personalized training data; the training information comprising specialty product information corresponding to a specialty product, the specialty product information being obtained from at least one expert source; said specialty product information comprising tasting notes by expert sources including expert opinion and treatises, similar products in a category, similar products in a category but at a lower price point, information on the product such as that supplied by a critic or an expert;
        provide said personalized training information to an audio media generating and downloading component.

11. The computer program product of claim 10 wherein said computer readable code is also capable of causing said at least one processor to:
    determine whether audio media, on which said assembled personalized training data has been downloaded, has been played in an audio player; and identify the audio player on which the audio media, on which said assembled personalized training data has been downloaded, was played.

12. The method of claim 1 wherein said training comprises training for hospitality industry employees.

13. The system of claim 5 wherein training comprises training for hospitality industry employees.

* * * * *